UNITED STATES PATENT OFFICE.

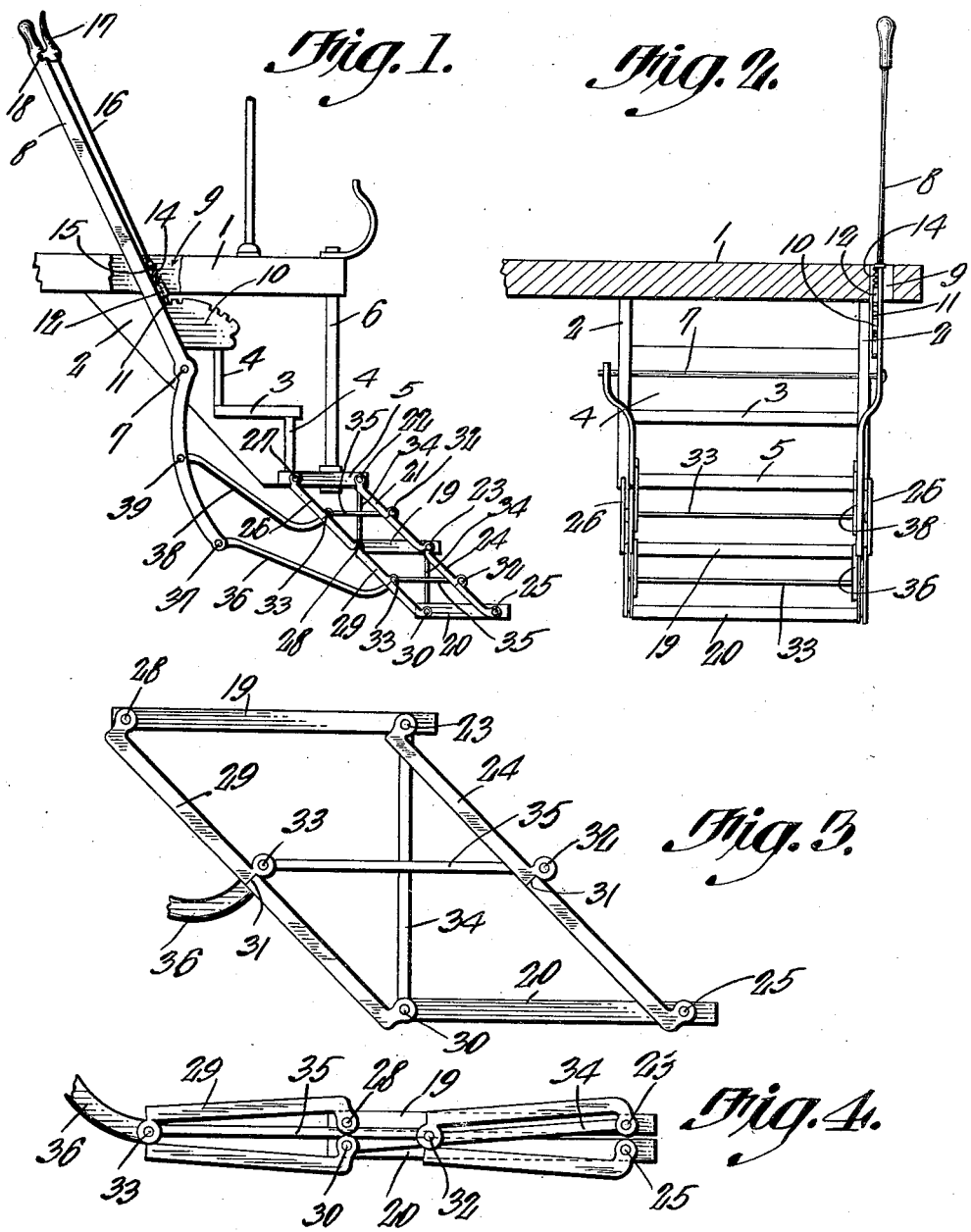

ROBERT E. LEE AND ROBERT L. POYTHRESS, OF NEWINGTON, GEORGIA.

FOLDING STEP.

1,065,533.

Specification of Letters Patent.

Patented June 24, 1913.

Application filed November 30, 1912. Serial No. 734,371.

*To all whom it may concern:*

Be it known that we, ROBERT E. LEE and ROBERT L. POYTHRESS, citizens of the United States, residing at Newington, in the county of Screven, State of Georgia, have invented a new and useful Folding Step, of which the following is a specification.

One object of the present invention is to provide a car step which may be folded readily into an out of the way position when not in use.

Another object of the invention is to provide novel means for operatively connecting the treads of the movable step.

The invention aims further, to provide novel means for actuating the movable step.

It is within the scope of the invention to increase the utility of device of the type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 shows the invention in side elevation; Fig. 2 is a rear elevation; Fig. 3 is a side elevation of the auxiliary treads, upon an enlarged scale; and Fig. 4 is a side elevation showing the auxiliary treads closed together.

In the drawing, the numeral 1 indicates the platform of a car, the numeral 2 indicates the stiles of the fixed steps, certain of the fixed treads being indicated at 3, and the risers being indicated at 4. The lower tread of the fixed steps is indicated specifically by the reference character 5, this tread 5 being commonly supported by a post 6 which extends upwardly into connection with the platform 1.

Journaled for rotation in the stiles 2 is a shaft 7, to one end of which is secured, intermediate its ends, a lever 8, adapted to move in a slot 9 formed in the platform 1. Secured to one of the stiles 2 is a segment 10, adapted to be engaged by a latch 11 slidable in a keeper 12 located on the lever 8. A spring 14 abuts against the latch 11 and against the lug 15 formed on the lever, the obvious function of the spring 14 being to maintain the latch 11 in engagement with the segment 10. The upper end of the latch 11 which slides in the lug 15, is united by means of a connection 16 with a latch lever 17 which is fulcrumed as shown at 18 upon the main lever 8.

The invention further includes auxiliary treads 19 and 20. The forward portion of the tread 19 is connected with the fixed lower tread 5 by means of supports 21, pivot elements 22 uniting the upper ends of the supports 21 with the fixed tread 5. Pivot elements 23 unite the lower ends of the supports 21 with the movable auxiliary tread 19. The upper end of a support 24 is mounted upon the pivot element 23, and by means of a pivot element 25, the lower end of the support 24 is connected with the forward portion of the lower auxiliary tread 20. Upper, rear supports 26 are shown, the upper ends of the supports 26 being pivoted as indicated at 27, to the rear portion of the fixed lower tread 5; pivot elements 28 unite the lower ends of the supports 26 with the auxiliary tread 19. Pivot elements 28 support the upper ends of the supports 29, the lower ends of which are united with the tread 20 by means of pivot elements 30. The supports 24, 21 26 and 29 are two-part structures, the parts of the supports knuckling together into alinement, as indicated at 31. Pivot elements 32 unite the parts of the supports 24 and 21, and transverse rods 33 unite the parts of the supports 29 and 26. Hangers 34 connect the pivotal elements 23 and 30 and braces 35 connect the pivot elements 32 and 33, both above and below the tread 19. Other hangers, also indicated by the reference character 34 connect the tread 19 with the fixed tread 5, these last specified hangers being connected with the pivot elements 28 and 22.

A link 36 extends rearwardly from the lower rod 33, the link 36 being pivoted to the lower end of the lever 8, as indicated at 37. Another link 38 is connected with the upper rod 33, the link 38 being pivoted as shown at 39 to the lever 8, below the shaft 7 which constitutes a fulcrum for the lever.

Presupposing that the parts are positioned as shown in Fig. 1 it will be understood that the latch lever 17 may be manipulated to withdraw the latch 11 from the segment 10, whereupon the upper end of the lever 8 may be swung forwardly. The lower end of the lever 8 will swing rearwardly and the links 36 and 38 will exert a pull upon the rods 33, the rods 33 causing the supports 29 and 26 to fold rearwardly, braces 35 causing the supports 24 and 21 to fold rearwardly, the tread 20 folding upwardly in close relation with respect to the tread 19, and the hangers 34 coming into approximate parallellism with the treads 20 and 19, the tread 19 coming into close relation to the tread 5. When the auxiliary steps are lowered, as shown in Fig. 1, the parts of the several hangers being folded together as indicated at 31, thus limiting the extent to which the tread 20 protrudes beyond the tread 19.

Having thus described the invention, what is claimed is:—

1. In a device of the class described, a super-structure; an auxiliary tread located below the super-structure; supports connecting the super-structure with the tread, the supports comprising coöperating parts adapted to knuckle together in alinement; pivot elements connecting the parts of the supports; a link connected with one pivot element; and a lever fulcrumed on the super-structure, the link being pivotally connected with the lever.

2. In a device of the class described, spaced treads; forward and rear supports; forward and rear pivot elements uniting the ends of the supports with the treads; a hanger mounted upon the forward pivot element of one tread and upon the rear pivot element of the other tread; the supports comprising coöperating parts having shoulders adapted to knuckle together; secondary pivot elements uniting the parts of the supports; a link connected with one secondary pivot element; a lever with which the link is connected; and means for fulcruming the lever.

3. In a device of the class described, spaced treads; forward and rear supports; forward and rear pivot elements uniting the ends of the supports with the treads; a hanger mounted upon the forward pivot element of one tread and upon the rear pivot element of the other tread; the supports comprising coöperating parts; secondary pivot elements uniting the parts of the supports; a brace uniting the secondary pivot elements; a link connected with one secondary pivot element; a lever with which the link is connected; means for fulcruming the lever; and means for holding the lever in adjusted positions.

4. In a device of the class described, spaced treads; front and rear foldable connections uniting the treads; a brace independent of the treads uniting the foldable supports; a hanger uniting the treads; and means for folding the supports.

In testimony that we claim the foregoing as our own, we have hereto affixed our signatures in the presence of two witnesses.

ROBT. E. LEE.
ROBT. L. POYTHRESS.

Witnesses:
W. W. EVANS,
T. S. LINDSAY.

---

Copies of this patent may be obtained for five cents each, by addressing the "Commissioner of Patents, Washington, D. C."